United States Patent
Boncato

(10) Patent No.: US 11,482,922 B2
(45) Date of Patent: Oct. 25, 2022

(54) CONTROL CIRCUITS WITH PEAK CURRENT LIMIT PROTECTION FOR SWITCHED MODE POWER SUPPLIES

(71) Applicant: Astec International Limited, Kowloon (HK)

(72) Inventor: Yancy Fontanilla Boncato, Metro Manila (PH)

(73) Assignee: Astec International Limited, Kowloon (HK)

(*) Notice: Subject to any disclaimer, the term of this patent is extended or adjusted under 35 U.S.C. 154(b) by 77 days.

(21) Appl. No.: 17/167,156

(22) Filed: Feb. 4, 2021

(65) Prior Publication Data
US 2021/0159779 A1 May 27, 2021

Related U.S. Application Data

(63) Continuation of application No. 16/425,624, filed on May 29, 2019, now Pat. No. 10,917,003.
(Continued)

(51) Int. Cl.
*H02M 1/32* (2007.01)
*H02M 3/158* (2006.01)
(Continued)

(52) U.S. Cl.
CPC .......... *H02M 1/32* (2013.01); *H02M 1/0025* (2021.05); *H02M 1/08* (2013.01); *H02M 1/4225* (2013.01); *H02M 3/158* (2013.01); *H02M 1/0009* (2021.05)

(58) Field of Classification Search
CPC ........ H02M 1/32; H02M 1/08; H02M 1/4225; H02M 1/0009; H02M 1/0025;
(Continued)

(56) References Cited

U.S. PATENT DOCUMENTS

2012/0169307 A1 7/2012 Chen et al.
2016/0301244 A1* 10/2016 Terry ........................ H02J 7/00
(Continued)

OTHER PUBLICATIONS

X. Qiu, Y. Fang, L. He, Y. Xing and H. Wang, "Novel Over-Current Protection for Peak Current Regulated DC-DC Converter," IECON 200—33rd Annual Conference of the IEEE Industrial Electronics Society, 2007, pp. 1995-1998 (Year: 2007).*
(Continued)

*Primary Examiner* — Kyle J Moody
*Assistant Examiner* — Jye-June Lee

(57) ABSTRACT

An electronic circuit comprises a first and second comparators and a first summer. The first comparator is configured to perform a first comparison to compare a first current reference signal with a signal representing an input current and configured to generate a first current error signal based on the first comparison. The second comparator is configured to perform a second comparison to compare a second current reference signal with the signal representing the input current and configured to generate a second current error signal based on the second comparison. The first summer is configured to adjust a first summer input error signal based on a second summer input error signal. The first summer input error signal is based on the first current error signal, and the second summer input error signal is based on the second current error signal.

20 Claims, 10 Drawing Sheets

Related U.S. Application Data

(60) Provisional application No. 62/732,915, filed on Sep. 18, 2018.

(51) Int. Cl.
*H02M 1/42* (2007.01)
*H02M 1/08* (2006.01)
*H02M 1/00* (2006.01)

(58) Field of Classification Search
CPC .. H02M 1/0085; H02M 3/158; H02M 3/1584; H02M 3/157; Y02B 70/10
See application file for complete search history.

(56) References Cited

U.S. PATENT DOCUMENTS

2019/0006935 A1* 1/2019 Wang ................. H02M 1/08
2019/0089245 A1* 3/2019 King ................. H02M 3/158
2019/0260289 A1   8/2019 Leisten et al.

OTHER PUBLICATIONS

Grote et al., Digital Control Strategy for Multi-Phase Interleaved Boundary Mode and DCM Boost PFC Converters, University of Paderborn, DELTA Energy Systems GmbH, Oct. 2011, 8 pages.
Youn et al.; A Digital Predictive Peak Current Control for Power Factor Correction With Low-Input Current Distortion, Jan. 2016, 13 pages, vol. 31, No. 1.

* cited by examiner

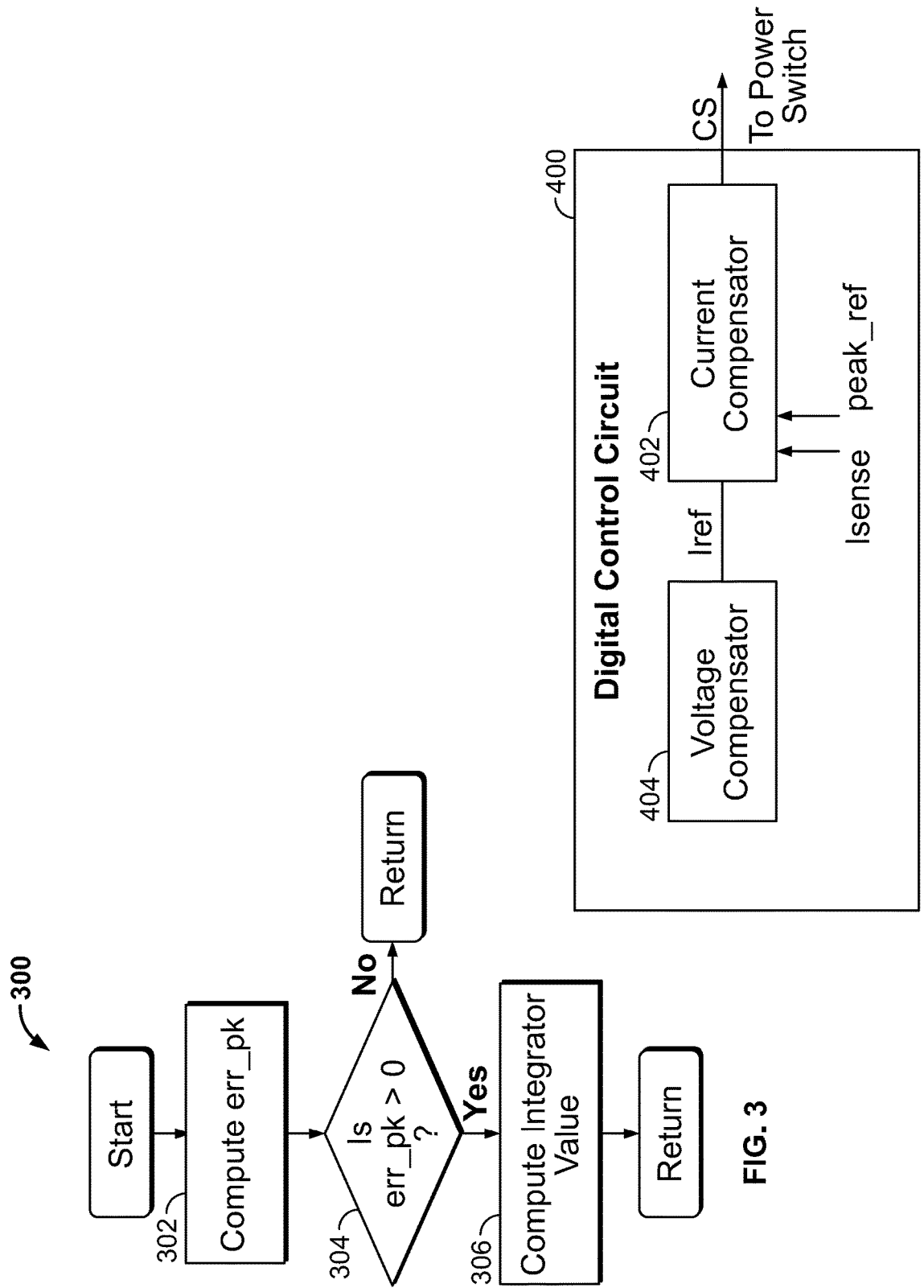

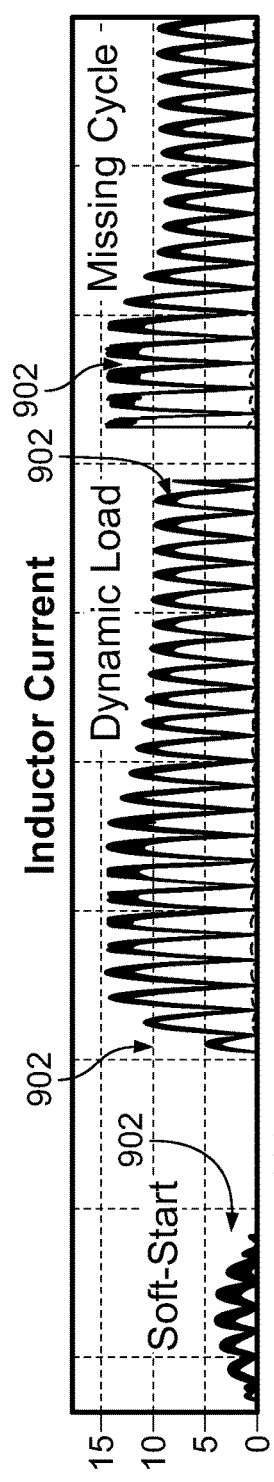
FIG. 9
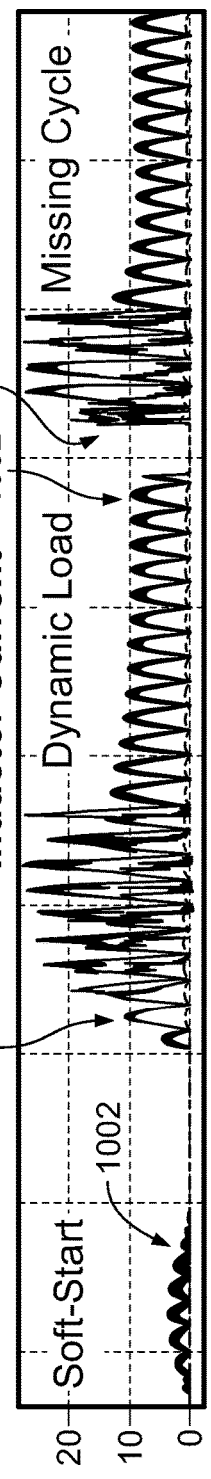
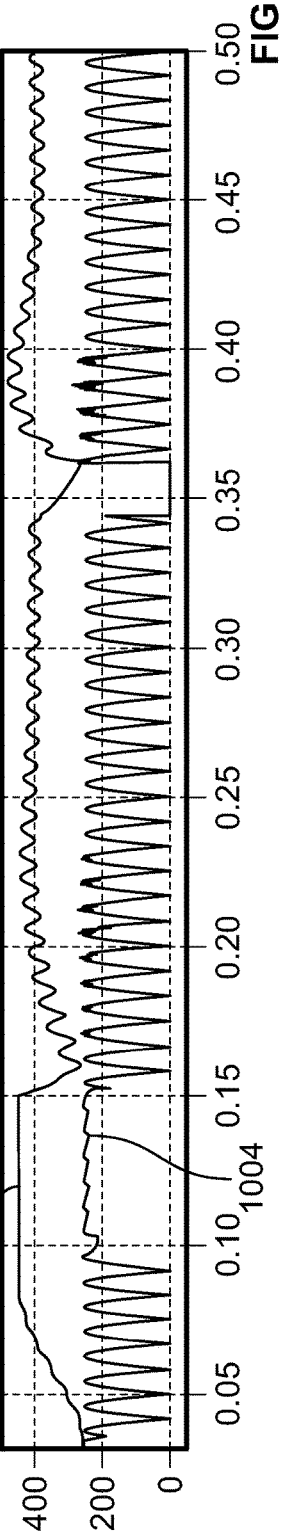
FIG. 10

CONTROL CIRCUITS WITH PEAK CURRENT LIMIT PROTECTION FOR SWITCHED MODE POWER SUPPLIES

CROSS-REFERENCE TO RELATED APPLICATIONS

This application claims the benefit and priority of U.S. application Ser. No. 16/425,624, filed May 29, 2019, which claims the benefit and priority of U.S. Provisional Application No. 62/732,915, filed Sep. 18, 2018. The entire disclosures of the above applications are incorporated herein by reference.

FIELD

The present disclosure relates to control circuits with peak current limit protection for switched mode power supplies.

BACKGROUND

This section provides background information related to the present disclosure which is not necessarily prior art.

Switching power supplies commonly include power circuits having switches and control circuits. The control circuits may include current compensators that generate error signals for controlling the power switches. The error signals are provided to drivers in the control circuits for generating control signals. Sometimes, the control circuits include analog components for limiting current in the power circuits. For example, analog comparators may compare one or more sensed currents with one or more peak current reference signals, and provide output signals to the drivers. The output signals may alter the control signals to limit peak currents in the power circuits.

SUMMARY

This section provides a general summary of the disclosure and is not a comprehensive disclosure of its full scope or all of its features.

According to one aspect of the present disclosure, an electronic circuit comprises a first and second comparators and a first summer. The first comparator is configured to perform a first comparison to compare a first current reference signal with a signal representing an input current and configured to generate a first current error signal based on the first comparison. The second comparator is configured to perform a second comparison to compare a second current reference signal with the signal representing the input current and configured to generate a second current error signal based on the second comparison. The first summer is configured to adjust a first summer input error signal based on a second summer input error signal. The first summer input error signal is based on the first current error signal, and the second summer input error signal is based on the second current error signal.

According to another aspect of the present disclosure, a method for limiting current in a switching power converter comprises performing, via a first comparator, a first comparison to compare a first current reference signal with a signal representing an input current and comprises generating a first current error signal based on the first comparison. The method also comprises performing, via a second comparator, a second comparison to compare a second current reference signal with the signal representing the input current and comprises generating a second current error signal based on the second comparison. The method further comprises adjusting, via a first summer, a first summer input error signal based on a second summer input error signal. The first summer input error signal is based on the first current error signal, and the second summer input error signal is based on the second current error signal.

Further aspects and areas of applicability will become apparent from the description provided herein. It should be understood that various aspects and features of this disclosure may be implemented individually or in combination with one or more other aspects or features. It should also be understood that the description and specific examples herein are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

FIG. 3 is a flow chart for implementing current limit protection according to yet another example embodiment.

FIG. 4 is a block diagram of a digital control circuit including a voltage compensator and a current compensator for implementing current limit protection according to another example embodiment.

FIG. 9 is a graph of waveforms representing an inductor current, an input voltage, and an output voltage of a non-interleaved power converter using analog current limit control.

FIG. 10 is a graph of waveforms representing an inductor current, an input voltage, and an output voltage of an interleaved power converter using analog current limit control.

Corresponding reference numerals indicate corresponding features throughout the several views of the drawings.

DETAILED DESCRIPTION

Figure 1:
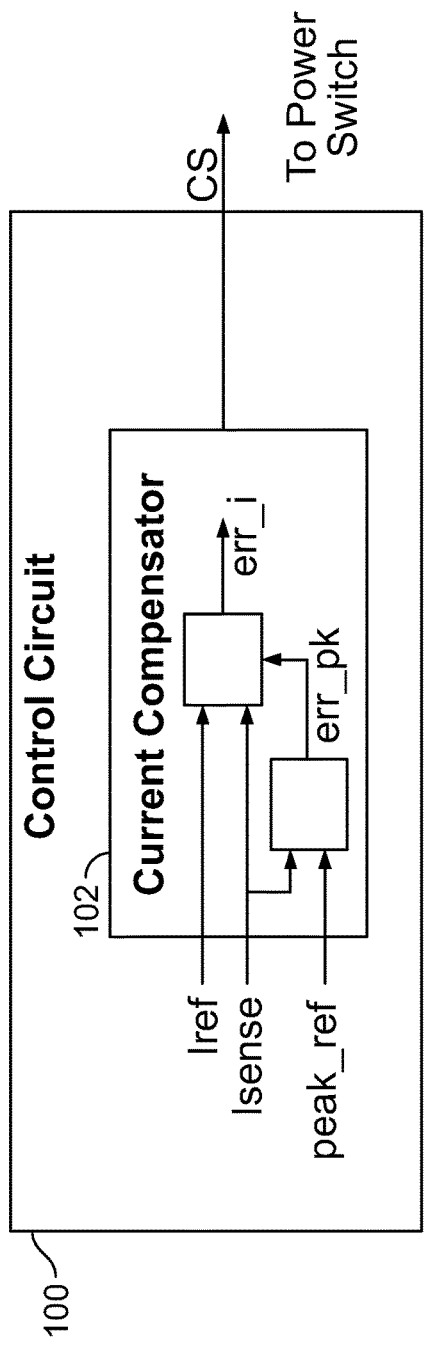
FIG. 1 is a block diagram of a control circuit for controlling a power converter and including a current compensator for implementing current limit protection according to one example embodiment of the present disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Example embodiments will now be described more fully with reference to the accompanying drawings.

A control circuit for a switching power converter according to one example embodiment of the present disclosure is illustrated in FIG. 1 and indicated generally by reference number 100. As shown in FIG. 1, the control circuit 100 includes a current compensator 102 configured to receive a current reference signal Iref, a peak current reference signal peak_ref and a signal isense representing an input current of the switching power converter, generate a current error signal err_i based on the input current signal isense and the current reference signal Iref for controlling at least one power switch of the power converter (via a control signal CS), generate a peak current error signal err_pk based on the input current signal isense and the peak current reference signal peak_ref, and adjust the current error signal err_i based on the peak current error signal err_pk to limit the amount of current flowing through the switching power converter.

By adjusting the current error signal err_i based on the peak current error signal err_pk, the control circuit 100 may control the power switch of the power converter to regulate an output of the power converter, and provide the power converter with peak current protection. For example, the power converter may experience a condition (e.g., a load change, a lost input, etc.) that forces a regulated output voltage to change. This may cause the current error signal err_i to adjust thereby causing the amount of current flowing through the power converter to surge. However, when the power converter begins to experience this surge in current, the current compensator 102 may adjust the current error signal err_i based on the peak current reference signal peak_ref. For example, the current compensator 102 may nullify a portion of the change (and in some cases the entire change) in the current error signal err_i caused by the changing output voltage. This adjustment of the current error signal err_i alters the control signal CS provided to the power switch. As a result, switching characteristics (e.g., frequency, pulse width, etc.) of the power switch may be adjusted to limit the amount of current flowing through the power switch and other electrical components in the power converter. As such, the stress on the components caused by high current may be minimized. In some examples, the amount of current flowing through the power converter (and the power switch) is prevented from increasing above a value of the peak current reference signal peak_ref. As such, the electrical components in the power converter are prevented from operating at and/or beyond safe operating levels.

Figure 2:
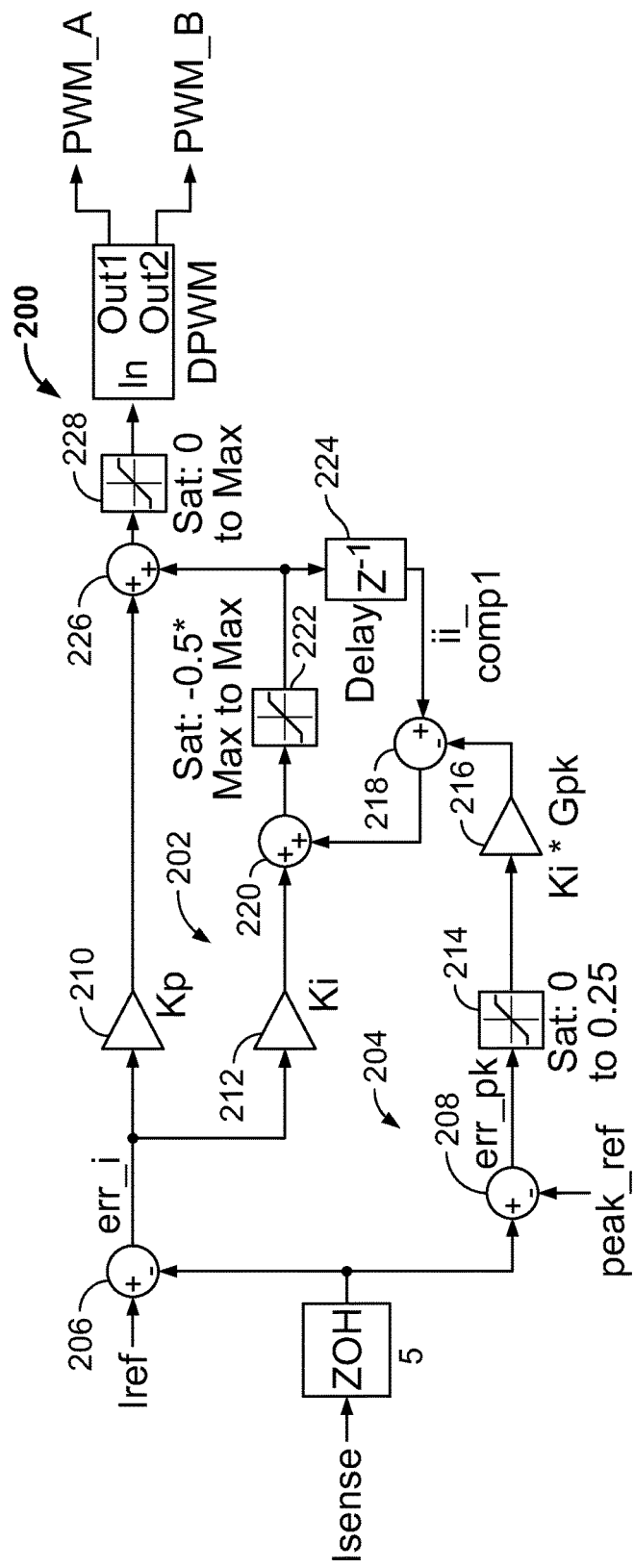
FIG. 2 is a circuit diagram of a current compensator including two control loops, one control loop that generates an error signal for controlling one or more power switches and the other control loop that generates a peak error signal for adjusting the error signal according to another example embodiment.

FIG. 2 illustrates a current compensator 200 for controlling at least two power switches and providing current limit protection. In the particular example of FIG. 2, the current compensator 200 is part of a digital control circuit. However, it should be apparent to those skilled in the art that the features disclosed herein may be employed in other control circuits as further explained below.

Similar to the current compensator 102 of FIG. 1, the current compensator 200 of FIG. 2 receives a current reference signal Iref, a peak current reference signal peak_ref and a signal isense representing an input current of a power converter. As shown in FIG. 2, the current compensator 200 includes two discrete control loops, one control loop 202 generates a current error signal err_i, and the other control loop 204 adjusts the current error signal err_i for current limit protection. FIG. 3 illustrates a flowchart 300 for adjusting the current error signal err_i based on operation of the control loop 204.

As shown, the input current signal isense is provided to both control loops 202, 204. Specifically, the signal isense is provided to comparator 206, 208. In some examples, and as shown in FIG. 2, the input current signal isense may pass through an optional zero-order hold (ZOH) device. The ZOH device of FIG. 2 represents a sample and hold (S&H) circuit that samples the input current signal isense (e.g., an analog signal) and holds its value at a constant level for a period of time (e.g., a sample interval) to generate a digital signal.

The comparator 206 compares the input current signal isense (e.g., a value of the signal isense) and the current reference signal Iref (e.g., a value of the signal Iref), and generates the current error signal err_i based on the difference between the input current signal isense and the signal Iref. The current error signal err_i is then provided to amplifiers 210, 212. Specifically, the amplifier 210 multiples the error signal err_i with a proportional gain coefficient Kp, and the amplifier 212 multiples the error signal err_i with an integrator coefficient Ki. The output of the amplifier 212 is passed to a summer 220, which generates an integrator value of the current compensator 200.

As shown in FIG. 3, a peak current error signal err_pk is computed in block 302. For example, and with reference to the current compensator 200 of FIG. 2, the comparator 208 generates the peak current error signal err_pk based the received input current signal isense and peak current reference signal peak_ref. Specifically, the current compensator 200 may compute the peak current error signal err_pk by taking a difference between the input current signal isense and the signal peak_ref, as shown in FIG. 2.

In some examples, it may not be necessary to adjust the current error signal err_i. For example, it may be determined that the current passing through the power converter is satisfactory, and therefore current limiting actions may not be necessary. In such examples, the current limiting actions may be active when the input current signal Isense is greater than the peak current reference signal peak_ref.

For instance, and as shown in FIG. 2, the generated peak current error signal err_pk is passed to a limiter 214 for manipulating the signal err_pk based on a value of the signal err_pk. In such examples, when the value of the signal err_pk is less than zero (e.g., the input current signal Isense is less than the signal peak_ref), the signal err_pk is forced to zero. As such, the signal err_pk is inactive. If, however, the value of the signal err_pk is greater than zero (e.g., the input current signal Isense is greater than the signal peak_ref), the signal err_pk is active. These steps are also shown in block 304 of FIG. 3.

Referring back to FIG. 2, next the signal err_pk is passed to an amplifier 216 in the control loop 204. For example, the amplifier 216 receives the signal err_pk and outputs a modified error signal representing the product of the signal err_pk, a gain factor G and the integrator coefficient Ki. This modified error signal is provided to a comparator 218 of the control loop 204.

The gain factor G may be a real value ranging between 2 and 64. Alternatively, the gain factor G may be another suitable real value if desired. In some examples, quasi-sinusoidal waveform may be produced if the value of the gain factor and the integrator coefficient (G*Ki) is low. If this value (G*Ki) is high, instability may be introduced into the current compensator 200. As such, it may be preferable to have the value (G*Ki) between about 8 and about 16 to prevent instability in the power converter.

As shown in FIG. 2, the comparator 218 subtracts the modified error signal from a previous integrator value ii_comp1 of the current compensator 200 (e.g., generated by the summer 220), and outputs a signal representing this difference to the summer 220. For instance, the output of the summer 220 is passed through a limiter 222 to adjust the integrator value of the current compensator 200, and a delay device 224. This ensures the previous integrator value ii_comp of the current compensator (and not the present value) is provided to the comparator 218.

The summer 220 generates an output (e.g., an integrator value) representing the sum of the outputs provided by the amplifier 212 and the comparator 218. This action is represented by block 306 of FIG. 3. Specifically, the integrator value provided by the summer 220 of FIG. 2 is equal to (err_i*Ki)+ii_comp1−(err_pk*G*Ki). As a result, the current error signal err_i is adjusted by subtracting the peak current error signal.

The output of the summer 220 is then passed to another summer 226 (via the limiter 222). The summer 226 adds the output of the amplifier 210 (e.g., err_i*Kp) and the output of the summer 220, and provides an output that is passed through a limiter 228 to a generator DPWM. The generator DPWM then generates two PWM control signals PWM_A, PWM_B for controlling two power switches.

This ensures current flowing through the power switches and other components in the power converter is limited. For example, when the regulated output voltage of the power converter changes, the output of the amplifier 212 is forced to adjust which may cause a large current in the power converter. However, when the large current begins to flow in the power converter (e.g., when the current signal isense is greater than the peak current reference signal peak_ref), the integrator value provided by the summer 220 is adjusted based on the modified error signal (e.g., err_pk*G*Ki) to reduce (and in some cases nullify) the effect of the output of the amplifier 212 (e.g., err_i*Ki). As a result, the control signals PWM_A, PWM_B may be adjusted (as necessary) to force the current to remain constant at the value of the peak current reference signal peak_ref.

In some example embodiments, the peak current reference signal peak_ref of FIG. 2 may be set to a defined value. For example, the signal peak_ref may be set to a value between 130% and 180% of a peak current at a full-load condition (e.g., the full load peak current). This range of values may allow at least some amounts of power conversion when current levels begin to rise, while also supporting some overload conditions when the current control protection is active.

The input current signal isense of FIG. 2 may be sensed from one or more current sensors in the power converter. In some embodiments, and as further explained below, the input current signal isense may be provided by one current sensor. For example, the current sensor may be an isolated current sensor such as a sense resistor, a non-isolated current sensor such as a current transformer (CT), etc. The current sensor may take into account an average current if, for example, the power converter includes multiple rails operating in average voltage mode control.

The current reference signal Iref provided to the current compensator 200 may vary based on different parameters in the power converter. In some examples, the current reference signal Iref may be generated by another component in the digital control circuit. In such examples, the digital control circuit may include a voltage compensator (not shown in FIG. 2) for generating the current reference signal Iref.

For example, FIG. 4 illustrates a digital control circuit 400 including a current compensator 402 and a voltage compensator 404 for generating a current reference signal Iref for the current compensator 402. The current compensator 402 generates a control signal CS for controlling one or more power switches in a power converter based on the current reference signal Iref, an input current signal isense, and a peak current reference signal peak_ref, as explained above. The current compensator 402 may include the current compensator 102 of FIG. 1, the current compensator 200 of FIG. 2, and/or another suitable current compensator.

In some examples, the current reference signal Iref generated by the voltage compensator 404 may be based on various parameters of the power converter. For example, and as further explained below, the current reference signal Iref may be based on an input voltage of the power converter, an output voltage of the power converter and/or a reference voltage.

Figure 5:
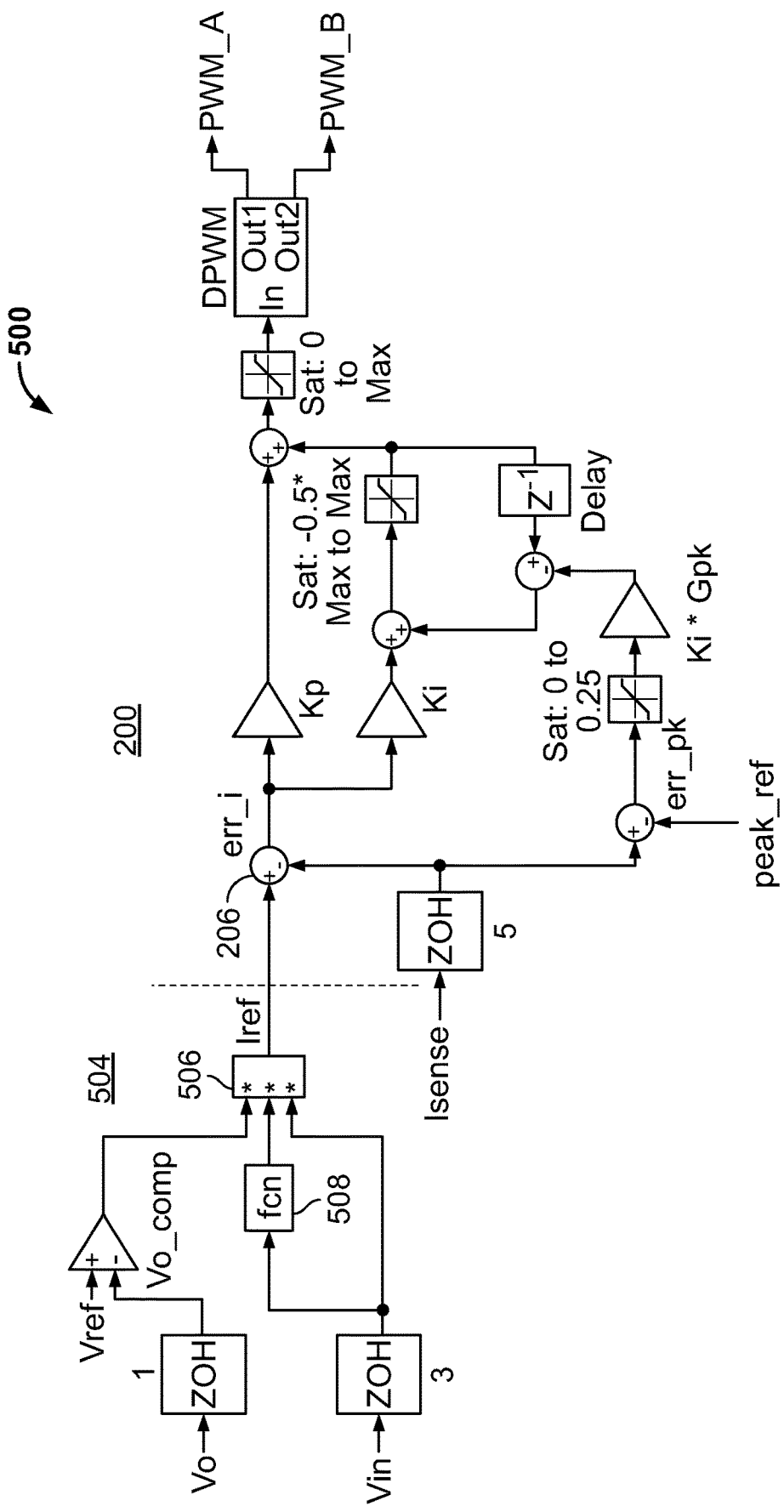
FIG. 5 is a circuit diagram of a voltage compensator and the current compensator of FIG. 2 coupled to the voltage compensator, according to yet another example embodiment.

FIG. 5 illustrates a digital control circuit 500 for controlling a power converter. As shown, the digital control circuit 500 includes the current compensator 200 of FIG. 2 and a voltage compensator 504 for generating the current reference signal Iref for the current compensator 200. If desired, the voltage compensator 504 of FIG. 5 may be employed as the voltage compensator 404 of FIG. 4.

The current reference signal Iref is generated based on an input voltage Vin of the power converter, an output voltage Vo of the power converter, and a reference voltage Vref. For example, and as shown in FIG. 5, the voltage compensator 504 includes a comparator Vo_comp, a multiplier 506, and a function block 508. The comparator Vo_comp compares the reference voltage Vref and the output voltage Vo of the power converter and provides an output to the multiplier 506. In some examples, and as shown in FIG. 5, the output voltage Vo may pass through an optional ZOH device, as explained above.

The function block 508 receives the input voltage Vin of the power converter and provides an output to the multiplier 506. For example, the function block 508 may output a signal representing the inverse of the square of the average input voltage (e.g., $1/(\text{average }(V_{in})^2)$. Alternatively, the function block 508 may output another signal if desired. Similar to the output voltage Vo, the input voltage Vin may pass through an optional ZOH device if desired.

As shown in FIG. 5, the multiplier 506 generates the current reference signal Iref based on the product of the output of the comparator Vo_comp, the output of the function block 508, and the input voltage Vin of the power converter. The current reference signal Iref is then passed to the comparator 206 of the current compensator 200, as explained above.

The voltage and/or current compensator disclosed herein may include various types of controllers. For example, the voltage and/or current compensator each may include a proportional-integral-derivative (PID) controller (e.g., PID pole controller, PID variant pole-zero controller, etc.), proportional-integral (PI) controllers, and/or other suitable controllers. For simplicity, the current compensator 200 of FIGS. 2 and 5 is shown as a PI controller.

The control circuits disclosed herein may include an analog control circuit, a digital control circuit, or a hybrid control circuit (e.g., a digital control unit and an analog circuit). If, for example, the control circuit is a digital control circuit, the control circuit may be implemented with one or more hardware components and/or software. For example, instructions for performing any one or more of the features disclosed herein may be stored in and/or transferred from a non-transitory computer readable medium, etc. to one or more existing digital control circuits, new digital control circuits, etc. In such examples, one or more of the instructions may be stored in volatile memory, nonvolatile memory, ROM, RAM, one or more hard disks, magnetic disk drives, optical disk drives, removable memory, non-removable memory, magnetic tape cassettes, flash memory cards, CD-ROM, DVDs, cloud storage, etc.

For example, the computer readable medium may include instructions for at least generating a current error signal based on an input current and a current reference signal, generating a peak current error signal based on the input current and a peak current reference signal, and adjusting the current error signal based on the peak current error signal.

The digital control circuits may be implemented with one or more types of digital control circuitry. For example, the digital control circuits each may include a digital signal controller (DSC), a digital signal processor (DSP), a microcontroller unit (MCU), a field-programmable gate array (FPGA), an application-specific IC (ASIC), etc.

The power converters disclosed herein may include any suitable topology such as a buck, boost, buck-boost, etc. topology for providing AC/DC, DC/AC and/or DC/DC power conversion. Additionally, the power converters may include one or more power circuits. For example, one power circuit in the power converters may include a front-end stage having an AC/DC boost PFC topology. In some examples, the power converters may include multiple power circuits coupled in parallel, and operated in sync (e.g., a multi-rail configuration). Alternatively, the multiple power circuits may be interleaved (e.g., a multiphase configuration).

Figure 6:
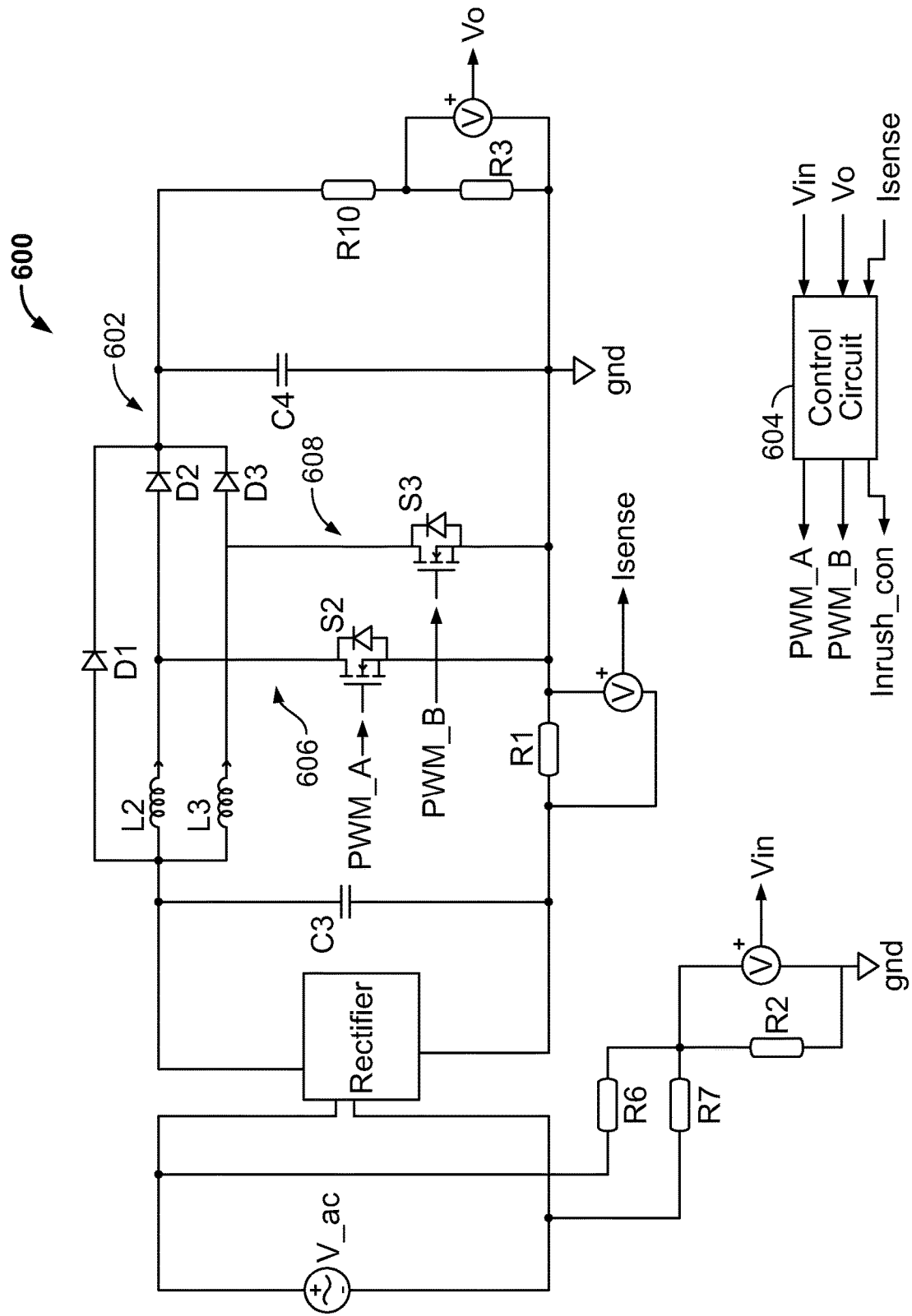
FIG. 6 is a circuit diagram of a power converter including AC/DC PFC boost circuitry with two power rails, and a control circuit for implementing current limit protection according to another example embodiment.

For example, FIG. 6 illustrates a power converter 600 including a power circuit 602 having multiple power switches S2, S3, and a control circuit 604 coupled to the power circuit 602 for controlling the power switches S2, S3. As shown, the power circuit 602 has a PFC boost topology. The control circuit 604 may include any one of the control circuits 100, 400, 500, and/or another suitable control circuit.

The power circuit 602 further includes a rectifier (e.g., a diode bridge rectifier, etc.) for rectifying an AC input voltage V_ac, a capacitor C3 coupled on an input side of the power switches S2, S3, a capacitor C4 coupled on an output side of the power switches S2, S3, diodes D1, D2, D3 and inductors L2, L3. The power switches S2, S3 may include field-effect transistors (FETs) such as MOSFETs (as shown in FIG. 6), and/or another suitable switching devices.

As shown in FIG. 6, the power circuit 602 includes multiple boost circuits coupled in parallel. For example, the power circuit 602 includes a boost circuit having the inductor L2, the diode D2 and the power switch S2, and another boost circuit having the inductor L3, the diode D3 and the power switch S3. The inductor L2, the diode D2 and the power switch S2 forms one rail 606, and the inductor L3, the diode D3 and the power switch S3 forms another rail 608. In the example of FIG. 6, the rails 606, 608 are interleaved so that they operate in different phases (e.g., as a multiphase configuration). This may reduce ripple current as compared to other non-interleaved examples. Alternatively, the rails 606, 608 of FIG. 6 may be operated simultaneously (e.g., as a multi-rail configuration) as explained above.

As shown in FIG. 6, the diode D1 is coupled across the inductors L2, L3 and the diodes D2, D3. The diode D1 (e.g., a bypass diode) provides a route for excessive current to pass from the input to the output when an input voltage is larger than an output voltage. This may assist in preventing components (e.g., the inductors L2, L3) from saturating during this condition.

In the example of FIG. 6, the control circuit 604 receives various inputs. For example, the control circuit 604 receives signals Vin, Vo, Isense. The signal Vin is generated by resistors R2, R6, R7 arranged in a voltage divider for sensing the input voltage V_ac, and the signal Vo is generated by resistors R3, R10 arranged in another voltage divider for sensing the output voltage. The signal Isense represents the combined current flowing through the rails 606, 608, and is generated by a single current sensor R1. Alternatively, a current sensor may be associated with each rail 606, 608 if desired. However, employing multiple current sensors increases components, and as a result, increases cost and complexity of the converter.

In some examples, the power converter 600 may include inrush protection circuitry (not shown) to minimize inrush current. The inrush protection circuitry may include a relay coupled in parallel with a thermistor, and/or another other suitable circuitry for minimizing inrush current. The inrush protection circuitry may be coupled between the capacitor C4 and a reference potential (e.g., ground), between the rectifier and the capacitor C3, etc. In such examples, the control circuit 604 may provide a signal inrush con to the inrush protection circuitry to activate the circuitry.

Figure 7:
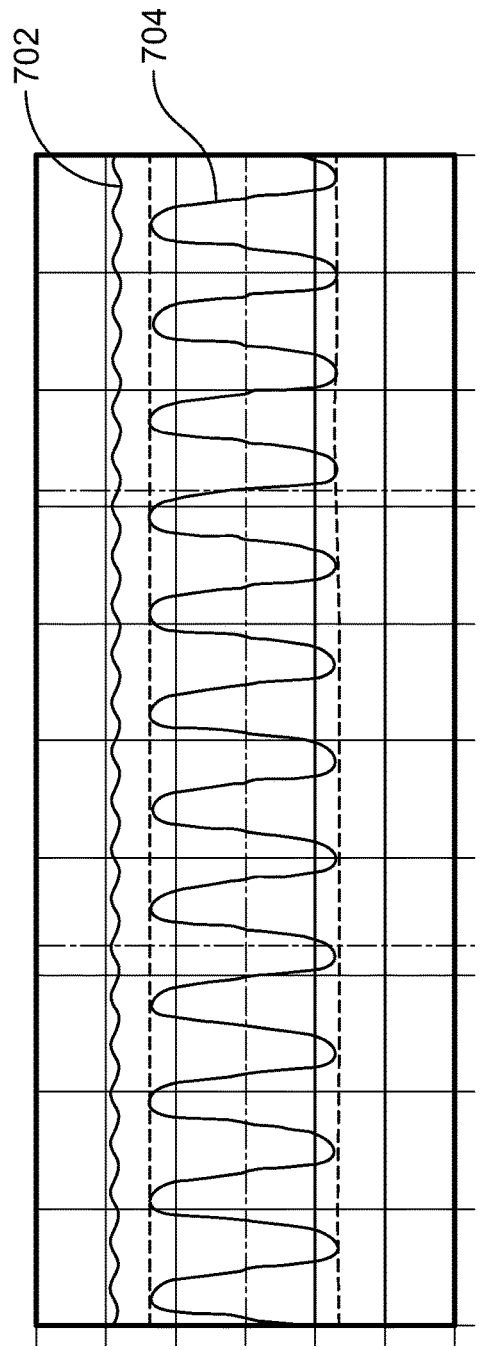
FIG. 7 is a graph of waveforms representing an inductor current and an output voltage of the power converter of FIG. 6 using current limit protection.

The control circuit 604 provides current limit protection for the power converter 600, and generates control signals PWM_A, PWM_B for controlling the power switches S2, S3 based on these inputs, as explained above. As such, the power switches S2, S3 may be controlled to regulate the output voltage of the power circuit 602 and maintain the amount of current flowing through the power converter 600 below a peak current limit. For example, FIG. 7 illustrates an output voltage waveform 702 of the power circuit 602 and an inductor current waveform 704 of the power circuit 602 during a simulation of an overload condition.

In the example of FIG. 6, the power circuit 602 starts operating when the input voltage V_ac is within a particular operating range. Once the power circuit 602 starts operating, a voltage reference Vref provided to a voltage compensator of the control circuit 604 (as explained above) may be ramped up from zero or a residual voltage value (e.g., based on the output) to a desired regulation point within a defined period of time (e.g., 20 msec, 50 msec, 100 msec, 200 msec, etc.). During this time, the output voltage of the power circuit 602 begins to ramp-up to the desired regulation point.

The power circuit 602 may experience current surges during input and/or output transient conditions. For instance, a load coupled to the power converter may increase from no load to half-load, half-load to full load, etc., thereby causing an output transient condition (e.g., a dynamic load condition). In other examples, the power converter may miss an input AC cycle (e.g., a lost input), thereby creating an input transient condition. In such cases, an output bulk voltage of the power converter may be sustained for a designed amount of time (e.g., a hold-up time). After which, the output bulk voltage may drop, causing the output of the voltage compensator to increase rapidly (and approach saturation levels) to force the output voltage back to regulation. This may result in large amounts of current flowing through the power switches S2, S3.

Figure 8:
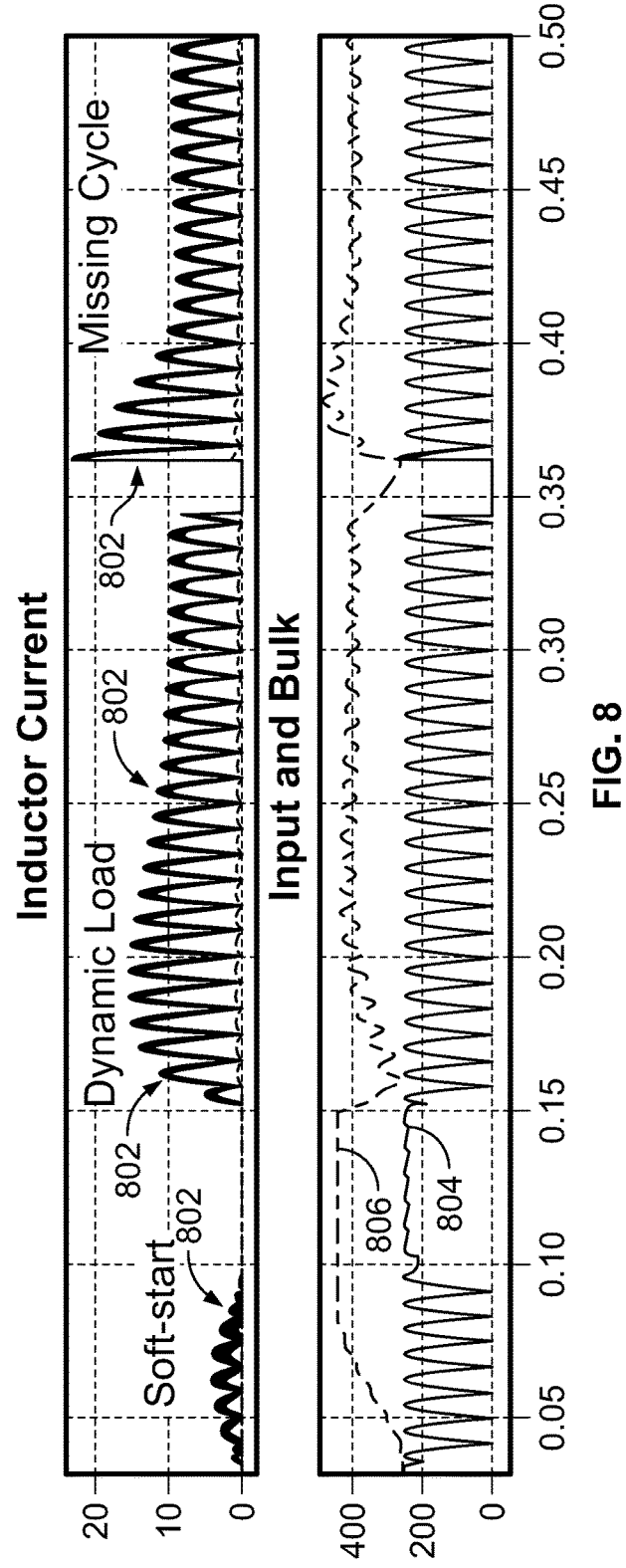
FIG. 8 is a graph of waveforms representing an inductor current, an input voltage, and an output voltage of a power converter without current limit control.

The transient conditions and their effects on the current and output voltage when no current limit protection is employed are shown in FIG. 8. For example, FIG. 8 illustrates various waveforms representing parameters of a power converter similar to the power converter 600 of FIG. 6, but without current limit control features. Specifically, FIG. 8 illustrates a waveform 802 representing current flowing through an inductor in the power converter, a waveform 804 representing an input voltage of the power converter, and a waveform 806 representing the bulk output voltage of the power converter. As shown, during dynamic load conditions and missing cycle conditions, the current surges to levels that may damage power switches in the power converter.

In some examples, analog current limit control may be employed to reduce current surges. However, this analog current limit control may not be able to prevent current surges as effectively as the current limit protection systems disclosed herein. For example, FIG. 9 illustrates waveforms representing parameters of a power converter using analog current limit control features. Specifically, a waveform 902 representing current flowing through inductors of an two-rail, non-interleaved power circuit, a waveform 904 representing an input voltage of the non-interleaved power circuit, and a waveform 906 representing a bulk output voltage of the non-interleaved power circuit. As shown, the current surges are substantially minimized during a dynamic load condition (e.g., a no load to a full load) and a missing cycle condition.

Additionally, FIG. 10 illustrates various waveforms representing voltage and current parameters in a two-rail, interleaved power circuit using analog current limit control. Specifically, FIG. 10 illustrates waveforms 1002 representing current flowing through two inductors of the interleaved power circuit, and waveforms 1004, 1006 representing an input voltage and a bulk output voltage, respectively, of the interleaved power circuit. As shown in FIG. 10, using analog current limit control allows current to surge substantially higher than the digital current limit protection system of FIGS. 7 and 11 (as further explained below).

Figure 11:
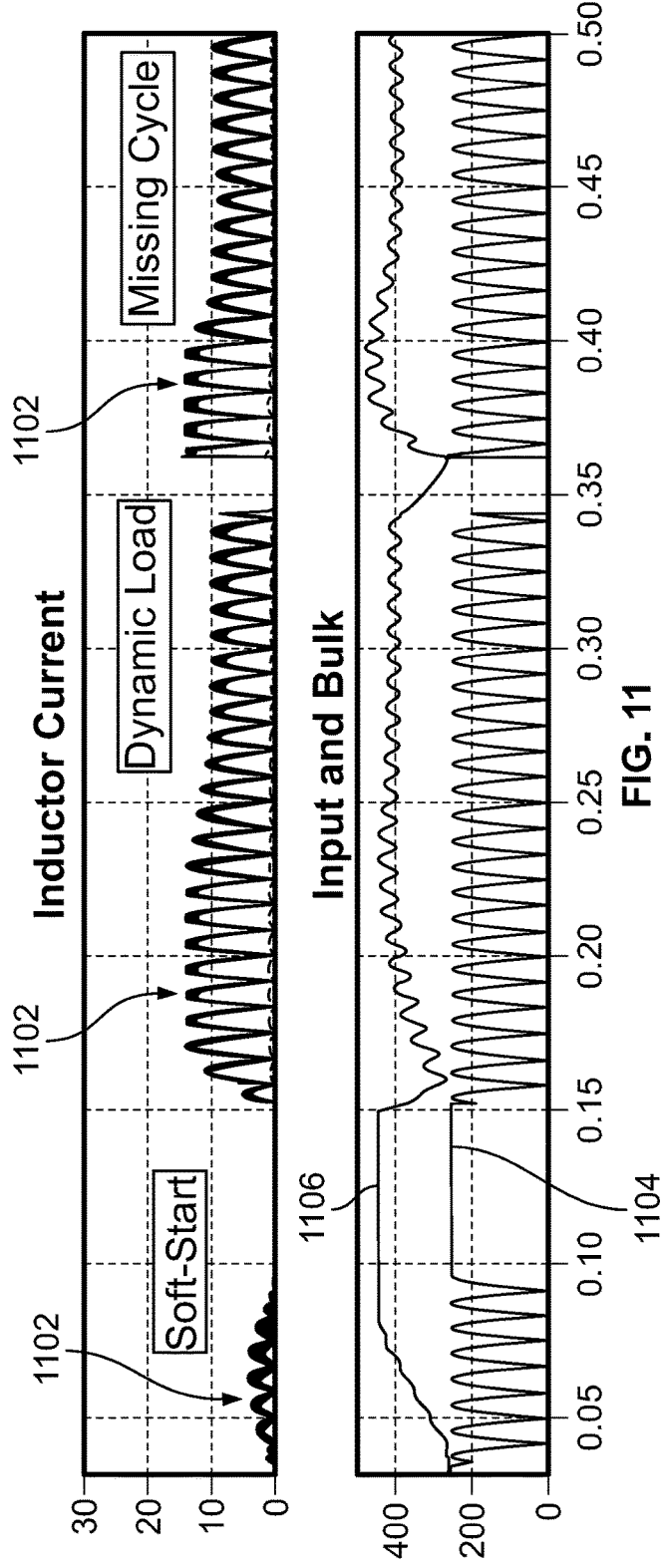
FIG. 11 is a graph of waveforms representing an inductor current, an input voltage, and an output voltage of a power converter using current limit protection according to another example embodiment.

FIG. 11 illustrates various current and voltage waveforms generated when a digital current limit protection system (as disclosed herein) is employed with a power circuit. Specifically, FIG. 11 illustrates a waveform 1102 representing current flowing through inductors of the power circuit, a waveform 1104 representing an input voltage of the power circuit, and a waveform 1106 representing a bulk output voltage of the power circuit. As shown, the current surges are substantially minimized during a dynamic load condition (e.g., a no load to a full load) and a missing cycle condition, as explained above.

In some examples, a switching power converter may experience a voltage surge and its control circuit may not react quick enough to adjust a current error signal to prevent large amounts of current to flow through the switching power converter. In such cases, the control circuit may disable operation of one or more power switches (e.g., prevent the power switches from turning on) in the switching power converter.

Figure 12:
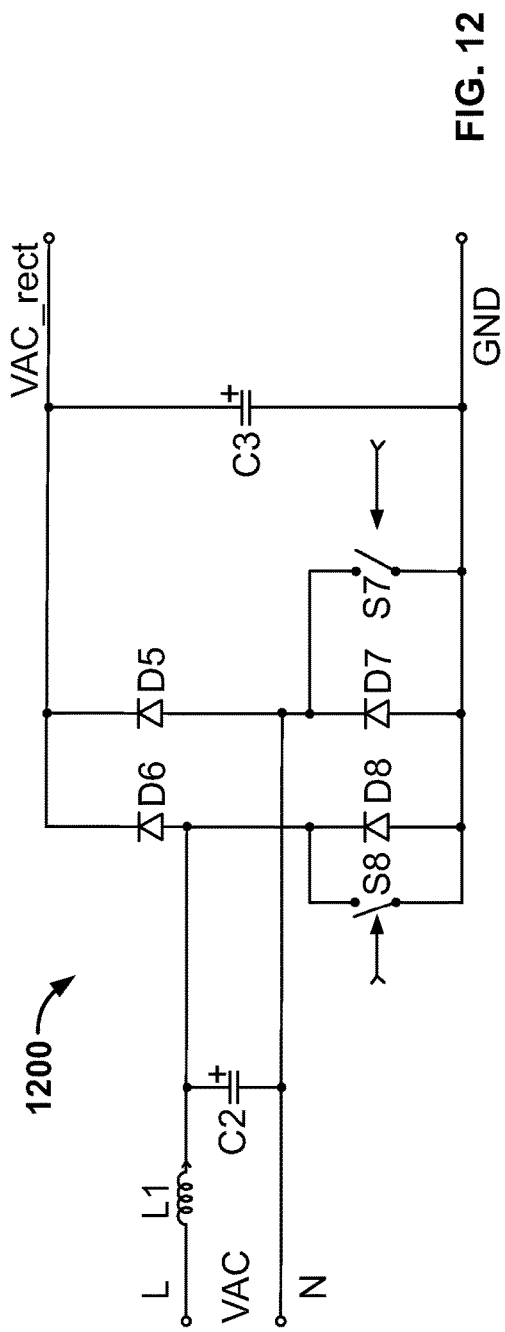
FIG. 12 is a circuit diagram of a bridge diode circuit of a switching power converter according to another example embodiment.

For example, FIG. 12 illustrates a bridge diode circuit 1200 of a switching power converter. As shown in FIG. 12, the bridge diode circuit 1200 includes four diodes D5-D8, two power switches S7, S8, capacitors C2, C3, and an input inductor L1. The power switch S7 is coupled in parallel with the diode D7, and the power switch S8 is coupled in parallel with the diode D8. When the AC input is in its positive half cycle, the diodes D6, D7 are active, and the power switch S7 is on to reduce a voltage drop on the diode D7. When the AC input is in its negative half cycle, the diodes D5, D8 are active, and the power switch S8 is on to reduce a voltage drop on the diode D8.

In some instances, the switching power converter may experience a voltage surge up to or above 600V for 10-20 microseconds. During this voltage surge, large amounts of current may accumulate within a few switching cycles. For example, current in the inductor L1 may double or triple due to the abrupt increase of the rectified voltage Vrect. In some cases, a current compensator may not react quick enough to reduce the high current (as explained above). As a result, the diodes D5-D8, the power switches S7, S8, other power switches (such as power switches S2, S3 of FIG. 6) in the switching power converter may be damaged. To prevent this high current from circulating through the bridge diode circuit 1200 and the switching power converter, the power switches S7, S8 and/or other power switches in the switching power converter may be disabled (e.g., turned off).

Figure 13:
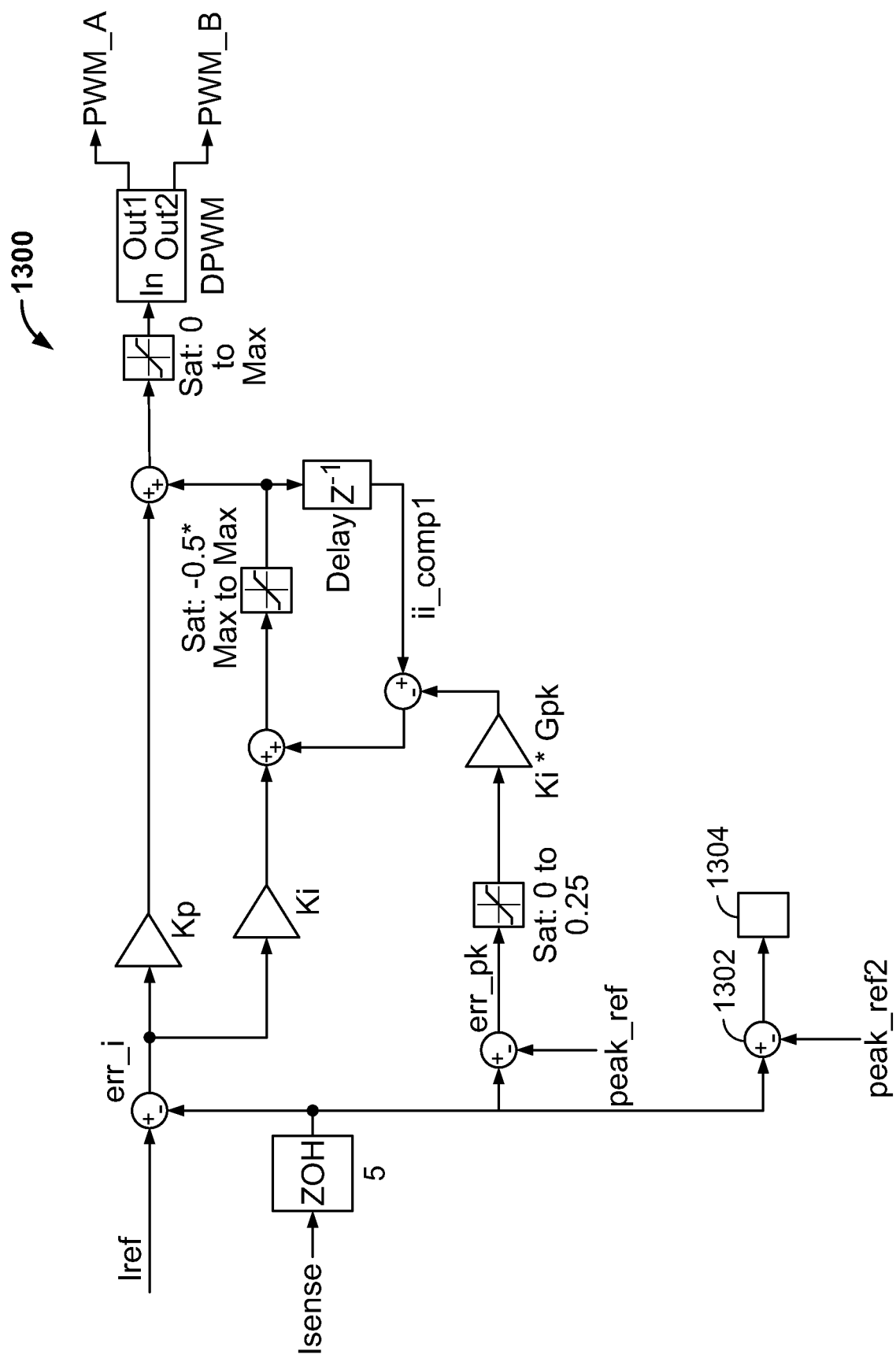
FIG. 13 is a circuit diagram of a current compensator for disabling power switches when excessive current is detected in a switching power converter, according to yet another example embodiment.
Figure 14:
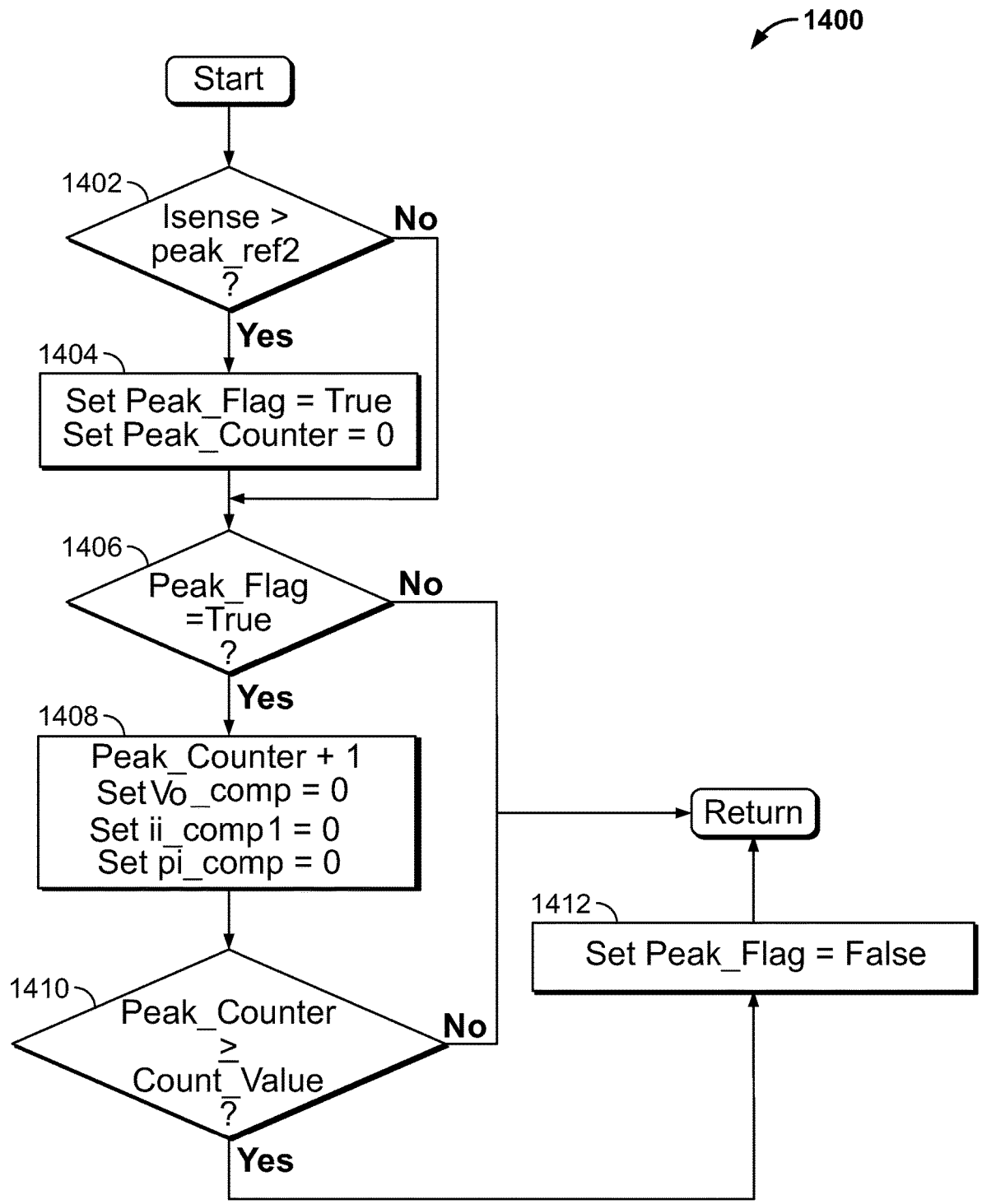
FIG. 14 is a flow chart for disabling power switches when excessive current is detected, according to another example embodiment.

For example, FIG. 13 illustrates a current compensator 1300 of a digital control circuit for controlling two power switches and providing current limit protection. The current compensator 1300 may control the power switches S7, S8 of FIG. 12, the power switches S2, S3 of FIG. 6, and/or other power switches. FIG. 14 illustrates a flowchart 1400 for disabling these power switches.

The current compensator 1300 includes a current limit protection scheme for disabling power switches in a power converter, limiting the amount of current flowing through the power converter, and controlling the power switches in the power converter (e.g., to regulate the power converter's output). For example, and as shown in FIG. 13, the current compensator 1300 includes the two control loops of the current compensator 200 of FIG. 2 for limiting current flow and controlling the power switches in the power converter. Additionally, the current compensator 1300 includes a comparator 1302 and a counter 1304. The comparator 1302 may be a digital comparator implemented with software or an analog comparator. In some examples, the comparator 1302 may be a peripheral comparator.

As shown in FIG. 13, the current compensator 1300 receives a peak current reference signal peak_ref2, and the current reference signal Iref, the peak current reference signal peak_ref and the input current signal isense of FIG. 2. The peak current reference signal peak_ref2 may be greater than the peak current reference signal peak_ref. For example, the peak current reference signal peak_ref2 may be about 25%, 50%, 75% greater larger than the peak current reference signal peak_ref. In some examples, the peak current reference signal peak_ref2 is set to a value between about 150% and 200% of a full load peak current to minimize interaction with normal switching power converter operation.

In the particular example of FIG. 13, the comparator 1302 compares the input current signal isense with the peak current reference signal peak_ref2. If the input current signal isense is greater the peak current reference signal peak_ref2, a signal may be provided to the counter 1304.

For example, and as shown in FIG. 14, when the comparator 1302 detects that the input current signal isense is above the peak current reference signal peak_ref2 in block 1402, a peak current flag (peak_flag) is set to "true," and the counter 1304 is set to 0 in block 1404. When the peak current flag (peak_flag) is set to "true" (in block 1406), the counter 1304 is increased by one (in block 1408). Additionally, an output of a voltage compensator Vo_comp (e.g., the voltage compensator Vo_comp of FIG. 5), an output of a current compensator ii_comp1, and an input of the generator DPWM are reset in block 1408. For example, these values may be reset by setting the values to zero (0) in memory, and/or employing one or more components in the current compensator 1300 of FIG. 13. By resetting one or more of these values, the PWM control signals PWM_A, PWM_B of FIG. 13 are forced to zero. As a result, the power switches are prevented from turning on.

In some examples, a delay may be employed to ensure the power switches are disabled for a defined period of time. This delay may be implemented with the counter 1304 of FIG. 13. For example, and as shown in FIG. 14, the value of the counter 1304 is compared to a defined threshold value (count_value) in block 1410. If the value of the counter 1304 is less than the defined threshold value (count_value), the process returns (e.g., to block 1406, etc.). If the value of the counter 1304 is greater than or equal to the defined threshold value (count_value) in block 1410, the peak current flag (peak_flag) is set to "false" in block 1412 and the process returns (e.g., to block 1402, etc.).

The defined period of time may be set to twenty (20) control cycles, 100 control cycles, and/or another suitable amount of control cycles. In other examples, the defined period of time may be the period of time until the next AC zero crossing.

The delay may be employed until the value of the counter 1304 reaches the defined threshold value (count_value). For example, after the defined period of time has elapsed, the voltage compensator vo_comp, the current compensator ii_comp1, and/or the generator DPWM may be released synchronously to produce a clean controlled current.

Figure 15:
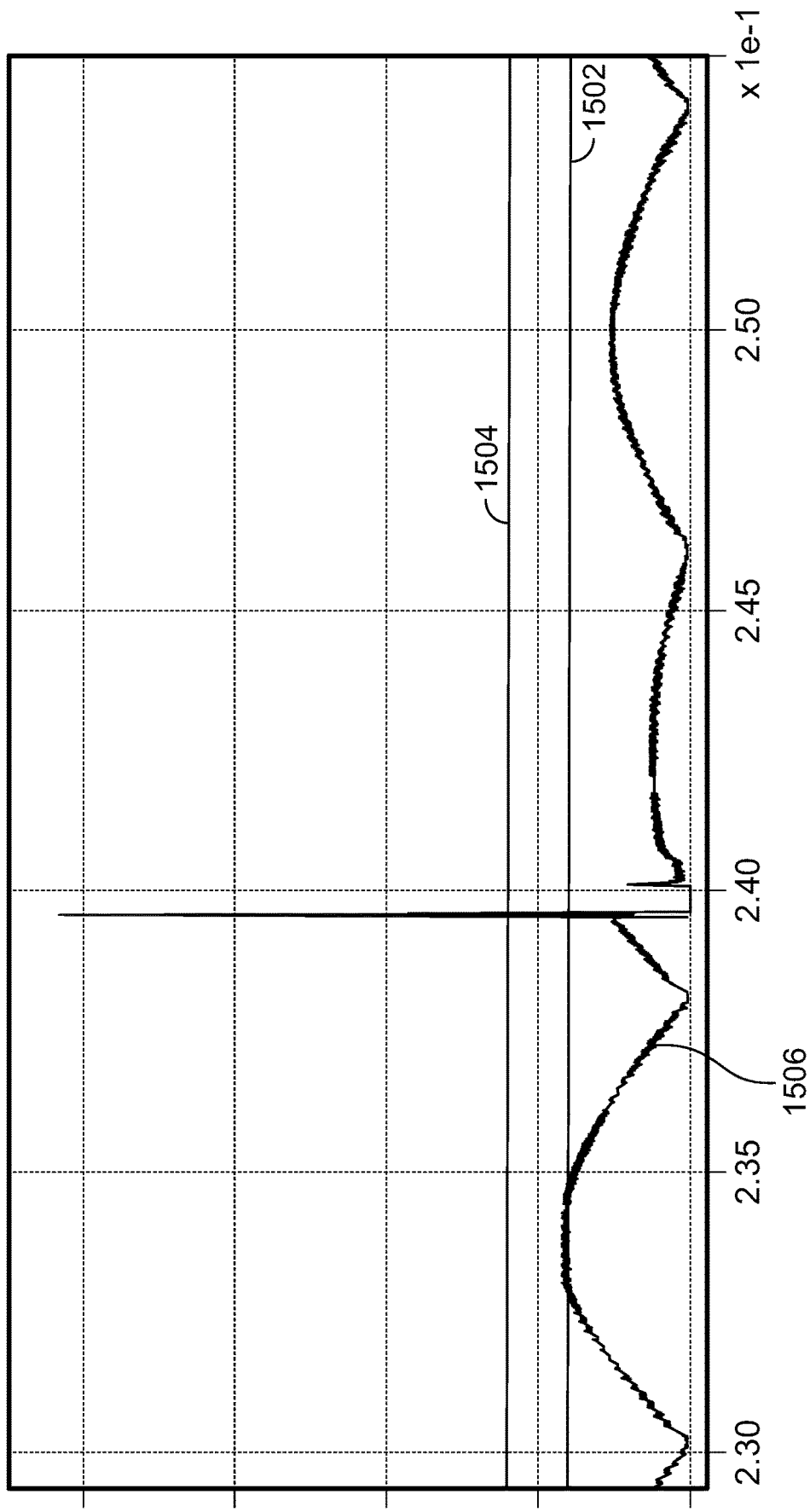
FIG. 15 is a graph of waveforms representing two peak current reference signals and current flowing in the switching power converter of FIG. 13, according to yet another example embodiment.

FIG. 15 illustrates examples of the peak current reference signal peak_ref, the peak current reference signal peak_ref2 and the input current isense described above relative to FIGS. 13 and 14. For example, the peak current reference signal peak_ref is represented by the line 1502, the peak current reference signal peak_ref2 is represented by the line 1504, and the input current signal isense is represented by the waveform 1506.

As shown in FIG. 15, after the input current signal isense (the waveform 1506) exceeds the peak current reference signal peak_ref2 (the line 1504), the input current drops to zero. This is due to the current compensator 1300 disabling the power switches as explained above. After a defined period of time, current begins to flow again in the power converter, as shown in FIG. 15.

By employing any one of the digital control circuits as disclosed herein, better peak current limit protection may be achieved as compared to other conventional control circuits such as analog control circuits with peak current limit protection. For example, the digital control circuits may provide cleaner and more stable protection than conventional control circuits. Also, and unlike conventional analog control circuits, the digital control circuits may prevent their current compensators from saturating while peak current limit protection is active.

Additionally, the digital control circuits may be implemented with less components and reduced complexity than conventional analog control circuits. As such, costs of producing, installing, maintaining, etc. the digital control circuits may be reduced as compared to conventional analog control circuits.

Further, the digital control circuits may utilize the input current of associated power circuits as a feedforward control. As such, the input current may be fed to a current compensator, as explained herein. This forces the digital control circuits to operate in a closed loop configuration.

In addition, the digital control circuits with peak current limit protection may be implemented with various kinds of power circuits including, for example, single phase and/or multiphase power circuits with a single power rail and/or multiple power rails.

The power converters disclosed herein may be employable in a variety of applications. For example, the power converters may be employed in server applications and/or other standard power supply applications. In some examples, the power converters may receive a variety of different AC inputs. For example, the power converters may receive an AC input voltage ranging between 90-180 VAC and 180-264 VAC, and an AC input current ranging between 16 A-20 A. Additionally, the power converters may provide a DC output voltage of 12 VDC, 18 VDC, 24 VDC, 36 VDC, 48 VDC, 72V VDC, etc., and a DC output current of 250 A. In such examples, the power converters may have a power rating of 1500 W-3000 W. In other examples, the power converters may receive an AC input voltage ranging between 180-305 VAC, and AC input current (RMS) of about 18.3 A. Additionally, the power converters may provide a DC output voltage of 12 VDC, and a DC output current of 264 A. In such examples, the power converters may have a power rating of 3300 W.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An electronic circuit for limiting current in a switching power converter comprising: a first comparator configured to: perform a first comparison to compare a first current reference signal with a signal representing an input current; and generate a first current error signal based on the first comparison; a second comparator configured to: perform a second comparison to compare a second current reference signal with the signal representing the input current; and generate a second current error signal based on the second comparison; and a first summer configured to adjust a first summer input error signal based on a second summer input error signal; wherein the first summer input error signal is based on the first current error signal; and wherein the second summer input error signal is based on the second current error signal.

2. The electronic circuit of claim 1 further comprising:
a first amplifier configured to adjust the first current error signal based on an integrator coefficient; and
a third comparator configured to:
perform a third comparison to compare the second current error signal with a previous value of the first current error signal adjusted based on the integrator coefficient; and
modify the second current error signal based on the third comparison.

3. The electronic circuit of claim 2 further comprising a second summer configured to generate an integrator value via addition of the modified second current error signal with the first current error signal adjusted based on the integrator coefficient.

4. The electronic circuit of claim 3, wherein the second summer input error signal is further based on the integrator value.

5. The electronic circuit of claim 2 further comprising a second amplifier configured to adjust the first current error signal based on a proportional gain coefficient.

6. The electronic circuit of claim 5, wherein the first summer input error signal is further based on the first current error signal adjusted based on the proportional gain coefficient.

7. The electronic circuit of claim 2, wherein the third comparator is configured to modify the second current error signal based on the signal representing the input current being greater than the second current reference signal.

8. The electronic circuit of claim 1 further comprising a control signal generator configured to generate one or more control signals for controlling at least one power switch based on an output of the first summer.

9. The electronic circuit of claim 1, wherein the second comparator is configured to generate the second current error signal based on a difference between the signal representing the input current and the second current reference signal.

10. The electronic circuit of claim 1 further comprising a third comparator configured to:
perform a third comparison to compare a third current reference signal with the signal representing the input current; and
generate a signal based on the third comparison.

11. The electronic circuit of claim 10 further comprising a power switch;
wherein the electronic circuit is configured to turn off the power switch for a defined period of time if the signal representing the input current is greater than the third current reference signal.

12. The electronic circuit of claim 10, wherein the third current reference signal is greater than the second current reference signal.

13. A method for limiting current in a switching power converter, the method comprising:
performing, via a first comparator, a first comparison to compare a first current reference signal with a signal representing an input current;
generating a first current error signal based on the first comparison;
performing, via a second comparator, a second comparison to compare a second current reference signal with the signal representing the input current;
generating a second current error signal based on the second comparison; and
adjusting, via a first summer, a first summer input error signal based on a second summer input error signal;
wherein the first summer input error signal is based on the first current error signal; and
wherein the second summer input error signal is based on the second current error signal.

14. The method of claim 13 further comprising:
adjusting, via a first amplifier, the first current error signal based on an integrator coefficient; and
performing, via a third comparator, a third comparison to compare the second current error signal with a previous value of the first current error signal adjusted based on the integrator coefficient; and
modify the second current error signal based on the third comparison.

15. The method of claim 14 further comprising generating, via a second summer, an integrator value via addition of the modified second current error signal with the first current error signal adjusted based on the integrator coefficient.

16. The method of claim 15, wherein the second summer input error signal is further based on the integrator value.

17. The method of claim 14 further comprising adjusting, via a second amplifier, the first current error signal based on a proportional gain coefficient.

18. The method of claim 17, wherein the first summer input error signal is further based on the first current error signal adjusted based on the proportional gain coefficient.

19. The method of claim 13 further comprising:
performing, via a third comparator, a third comparison to compare a third current reference signal with the signal representing the input current; and
generating a signal based on the third comparison.

20. The method of claim 19 further comprising turning off a power switch for a defined period of time if the signal representing the input current is greater than the third current reference signal.

* * * * *